United States Patent
Perinpanathan et al.

(10) Patent No.: US 6,636,522 B1
(45) Date of Patent: Oct. 21, 2003

(54) CALL REDIRECTION METHODS IN A PACKET BASED COMMUNICATIONS NETWORK

(75) Inventors: Nishanthan M. T. Perinpanathan, Montreal (CA); Alan S. Frank, Nepean (CA); Paul Thomas Taylor, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/563,413

(22) Filed: May 3, 2000

Related U.S. Application Data

(63) Continuation of application No. 08/810,854, filed on Mar. 4, 1997.

(51) Int. Cl.[7] ............................................. H04L 12/56
(52) U.S. Cl. ........................................ 370/409; 370/410
(58) Field of Search ................................. 370/310, 345, 370/349, 352, 353, 354, 355, 356, 401, 410, 396, 397, 398, 399, 400, 409; 455/432.1, 433, 435.1, 445

(56) References Cited

U.S. PATENT DOCUMENTS

| | | | | |
|---|---|---|---|---|
| 5,537,467 A | * | 7/1996 | Cheng et al. | 379/211.02 |
| 5,579,375 A | * | 11/1996 | Ginter | 455/417 |
| 5,742,905 A | * | 4/1998 | Pepe et al. | 455/461 |
| 5,793,762 A | * | 8/1998 | Penners et al. | 370/389 |

* cited by examiner

*Primary Examiner*—Kwang Bin Yao

(57) ABSTRACT

Methods are provided which employ call redirection to provide services such as personal mobility, terminal mobility and call distribution in a packet-based network such as the Internet, or an intranet.

10 Claims, 8 Drawing Sheets

ID
CALL REDIRECTION METHODS IN A PACKET BASED COMMUNICATIONS NETWORK

RELATIONSHIP TO PRIOR APPLICATIONS

This application is a continuation of application Ser. No. 08/810,854 filed Mar. 4, 1997.

FIELD OF THE INVENTION

The invention relates to methods and applications of call redirection in packet-based multimedia communications networks.

BACKGROUND OF THE INVENTION

It is common in today's switch-based telephone networks to offer call redirection services such as call forwarding and call distribution, usually on a subscription basis. When a subscriber having a default DN (directory number) wants to activate call forwarding for example, the subscriber enters a forwarding DN, and a signalling procedure takes place between the subscriber's telephone and a network node which may be a telephone network switch, or an AIN (advanced intelligent network) based SSP (service switching point) for example. The network node then controls the redirection of calls initially directed towards the subscriber's default DN such that they are received at the forwarding DN. Such a centralized mechanism for providing features to subscribers requires a substantial investment in operations, administration, and maintenance functions.

The use of computing devices connected to an IP (internet protocol), ISDN (integrated serviced digital network) or ATM (asynchronous transfer mode) based LAN (local area network) or WAN (wide area network)) to assume multimedia communications roles has recently become increasingly widespread. Examples of this include voice communications and video conferencing communications over private intranets or the public Internet. It is desirable to be able to offer users of such multimedia communications media call redirection features which are similar to those which are available to normal telephone subscribers. For example, when an end-user having a computer normally connected to a default location with a normal address within a particular LAN moves to a different known location where he/she has access to another computer having a different address, it would be useful to be able to have multimedia calls placed to his/her normal address forwarded to the different address. A dedicated computing device or server may be used to provide the required call redirection capability to a number of end-users. This "server based" approach requires related operations, administration and maintenance functionality, requires address translation and related signalling from the end-user's computing device to the dedicated computing device, all of which adds complexity which may not be desirable from an administrative authority's perspective. In addition, having the call redirection functionality on a dedicated device offers limited end-user control and customization over how his/her calls are to be forwarded.

The Mobile IP Protocol (defined by the mobile IP work group within the IETF (Internet Engineering Task Force)) is an existing IP (Network) layer procedure for terminal mobility within the Internet/Intranet [Perkins, C., Editor, "IP Mobility Support", RFC 2002, October 1996]. This protocol, however, requires the modification of a mobile host's IP stack to handle IP encapsulation or tunnelling, the modification of the home router's IP stack to support the functionalities of a Home Agent (i.e. encapsulating/decapsulating and tunnelling both call signalling and media packets to the destination c/o address), the existence of a Foreign Agent on the foreign network (router) to handle IP encapsulation/decapsulation and tunnelling at the far end, procedures to discover and register with Home Agents and Foreign Agents, and procedures to gain access to firewalls when the callee's mobile host is attached to a subnetwork behind a firewall.

Although comprehensive and currently gaining wide acceptance, the Mobile IP protocol requires modification to both the home network router's, foreign network router's and the mobile host's IP stack before being applied to realize terminal mobility. It provides very little end user control over how his/her calls are to be redirected, since call redirection is performed at the IP layer within the router.

SUMMARY OF THE INVENTION

It is an object of the invention to obviate or mitigate one or more of the above identified disadvantages.

According to a first broad aspect, the invention provides a personal mobility method for allowing a callee having a personal host connected to a packet based communications network at a home address to receive, at a foreign host connected to the network having a c/o (care/of) address, a multimedia call from a calling host originally directed towards the personal host, the method comprising the steps of: a) a call redirector application running on the personal host responding to a call setup request from the calling host with a call setup reply which includes the c/o address; b) the calling host sending a call setup request to the foreign host at the c/o address; and c) the foreign host sending a call setup reply, thereby completing the call signalling required to establish a link between the calling host and the foreign host.

According to a second broad aspect, the invention provides a terminal mobility method for allowing a callee having a mobile host normally connected to a packet based communications network at a home address to receive, at a their mobile host connected at a c/o (care/of) address, a multimedia call from a calling host originally directed towards their personal host, the method comprising the steps of: a) a call redirector application running on a shadow host intercepting a call setup request addressed to the personal host from the calling host with a call setup reply which includes the c/o address; b) the calling host sending a call setup request to the mobile host at the c/o address; and c) the mobile host sending a call setup reply, thereby completing the call signalling required to establish a link between the calling host and the mobile host.

According to a third broad aspect, the invention provides a call distribution method for distributing multimedia calls among a plurality of peer computing devices connected to a packet based communications network, each computing device having an address, one of the peer computing devices having a main address and being equipped with a call redirector application, the method comprising the steps of: a) the call redirector application running on the computing device having the main address responding to a call setup request from the calling host with a call setup reply which includes a redirecting address consisting of the address of one of the plurality of peer computing devices; b) the calling host sending a call setup request to the redirecting address; c) said one of the plurality of computing devices a call setup reply, thereby completing the call signalling required to establish a link between the calling host and the one of the plurality of computing devices.

According to a fourth broad aspect, the invention provides a call distribution method for distributing multimedia calls among a plurality of peer computing devices connected to a packet based communications network, each computing device having an address, one,of the peer computing devices having a main address and being equipped with a call redirector applications, the method comprising the steps of: a) the call redirector application running on the computing device having the main address responding to a call setup request from the calling host with a call setup reply; b) said one of the plurality of peer computing devices sending a call setup request to the computing device having the main address indicating that that device is available; c) the computing device having the main address responding with a call setup reply containing the address of the calling host; d) the one of the plurality of computing devices sending a call setup request to the calling host; e) the calling host responding with a call setup reply, thereby completing the call signalling required to establish a link between the calling host and the one of the plurality of computing devices; f) the calling terminal sending a disconnect message to the device having the main address.

It is noted that unlike the previously discussed Mobile IP protocol proposed for terminal mobility within the Internet, the terminal mobility provided by the invention is a simple, lightweight solution that provides greater end-user service control and customization.

The terminal mobility according to the invention requires none of the functionalities or capabilities the Mobile IP protocol solution requires to realize terminal mobility. Being an application layer solution, it not only allows the end-user greater control and the ability to customize how and where his/her calls are to be redirected, but it also allows this service capability to be packaged and delivered with emerging multimedia base services through proper interfaces.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

The basic steps in establishing a multimedia connection between two computing devices include call setup signalling, a negotiation phase during which capabilities are exchanged, the establishment of a connection for voice/text/video transmission, and finally the actual transmission of media streams. The invention provides methods for use during the call setup signalling phase for redirecting multimedia calls in various ways.

The basic idea of call redirection is included at a conceptual level in the existing proposals for the draft ITU-T Recommendation H.323, entitled "Visual Telephone Systems and Equipment for Local Area Networks which provide a Non-Guaranteed Quality of Service". ITU-T is a body established by international treaty to provide recommendations for communications services and procedures in the interest of interoperability. The H.323 Recommendation provides a redirection function which allows multimedia calls to be redirected without the involvement of network routers. The various embodiments of the invention described below employ the call redirection functionality proposed for the H.323 standard to realize multimedia call redirection features consisting of personal mobility, terminal mobility, and call distribution.

Figure 1:
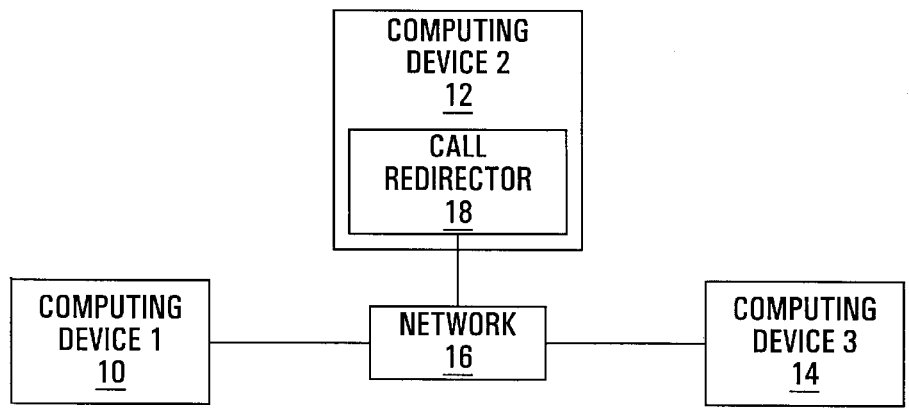
FIG. 1 is a basic block diagram of a packet based communications network.

The concept of call redirection will first be described with reference to FIGS. 1 and 2. Referring firstly to FIG. 1, shown are first, second and third computing devices 10,12,14 connected to the edge of a packet based network 16 (which may in fact be a network of networks) such that each computing device can make a multimedia call to any other computing device. The network 16 may be the IP based public internet, an IP based intranet, ISDN, or ATM network, for example. Each of the computing devices 10,12,14 has a transport address within the network, for example an IP address. Each computing device 10,12,14 is equipped with a "base service" application which allows a caller to send and receive multimedia calls over the network 16. For the purpose of illustration, it is assumed that the second computing device 12 is equipped with a "call redirector" functional component 18. The call redirector functional component 18 is an application running on the second computing device 12 and is interfaced with the base service application running on the same computing device. The call redirector functional component 18 is preconfigured upon activation to provide the transport address of an alternative computing device, for example, the transport address of the third computing device 14 when the call redirection capability is required.

Figure 2:
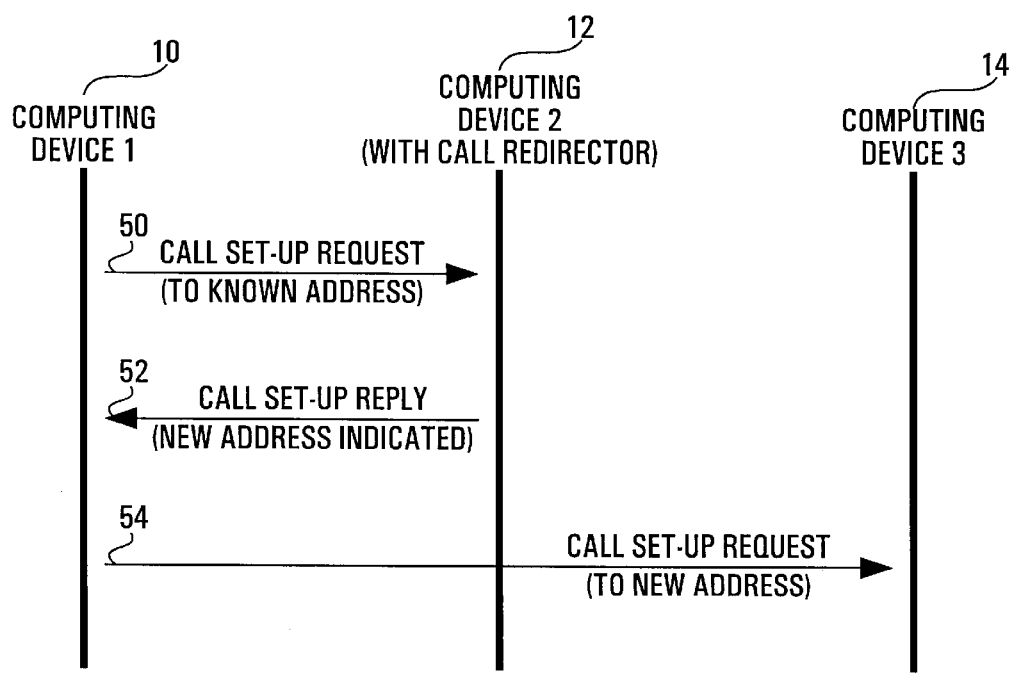
FIG. 2 is a signal flow diagram for call redirection.

Referring now to FIG. 2, the basic steps which take place in a call redirection scenario will be described.

The signal flow lines 50,52,54 represent signalling or message flows between the computing devices 10,12,14.

Firstly, an end-user at the first computing device 10 decides to initiate a multimedia communication session with the end-user at the second computing device 12. For this purpose, the base service of the first computing device 10 initiates a call set-up request 50 to the transport address of the second computing device 12. Computing device 10 may also send a message to cancel the initial connection request, depending on the specifics of the protocol used to realize the redirection.

The call set-up request 50 is processed by the base service of the second computing device 12. If the second computing device 12 determines that the call redirector has been activated, an indication is sent to the call redirector functional component 18 to look up an alternative transport address, which in this example is the transport address of the third computing device 14 to which the call setup request 50 needs to be redirected. The base service of the second computing device 12 then initiates a call setup reply 52 to the first computing device 10 containing a message part indicating the transport address of the third computing device 14. If the second computing device 12 determines that call redirection need not be performed, it simply responds with a call setup reply containing an accept call or a reject call with reason message.

The call setup reply 52 is processed by the base service of the first computing device. After extracting the transport address in the message part of the call setup reply 52, the base service of the first computing device 10 initiates a new call setup request 54 to the transport address of the third computing device 14.

The first embodiment of the invention, referred to as Personal Mobility, will now be described with reference to FIGS. 3 and 4, and an implementation specific to particular existing protocols and standards will be explained with reference to FIG. 5. Personal mobility provides the ability for a callee to have multimedia calls originating from a caller and initially destined to the callee's personal or most frequently used computing device to be redirected to a different computing device. To begin, several terms will be defined for the case where the network 16 is an IP-based intranet.

A home address is an IP address assigned to a computing device for an extended period of time. It represents the permanent IP address of a callee on the network.

A care-of (c/o) address is an IP address assigned to a computing device at which a mobile callee can be reached. It represents the temporary IP address of a callee either on the home or foreign network.

The home network is a subnetwork having a network prefix matching that of a callee's home address. All packets destined to a callee's home address are delivered to this subnetwork.

The foreign network is any subnetwork other than the callee's home network.

A PH (personal host) is a stationary computing device to which the home address is assigned.

A FH (foreign host) is a stationary computing device to which the c/o address is assigned. The PH and FH may be attached to the same or different subnetworks within the network.

A CH (caller's host) is a stationary or mobile host (not necessarily owned by the caller) from which a caller initiates a call to the callee.

The call redirector is an application providing the call redirector functionality described above with reference to FIGS. 1 and 2. It is a piece of software which resides on the PH in order to redirect calls destined to a callee when the callee has moved to a FH. The call redirector is interfaced with the base service to provide the personal mobility service capability.

The base service, as referred to above, consists of application software (preferably with GUI (graphical user interface) capabilities) which allows a caller to send and receive voice, data, or video calls over the network of interest. The base service is installed on the PH, FH and the CH.

The PMA (personal mobility application) is application software which is a special version of the base service capable of processing the messages required to implement personal mobility. The PMA must be installed on the PH, the FH and the CH. It includes the call redirector functional component.

Personal mobility is provided by an application layer service capability that makes use of the above described call redirection signalling procedure to redirect a voice, data or video call received by a PH to a FH pre-specified by the end-user. The procedure is orchestrated by the call redirector functional component residing on the PH. As indicated above, the call redirector is interfaced with the base service, so that a user can control the actions of the redirector through the base service GUI for example. The FH must have an end-user registration capability. This may be implemented as a registration GUI forming part of the base service GUI for example.

Figure 3:
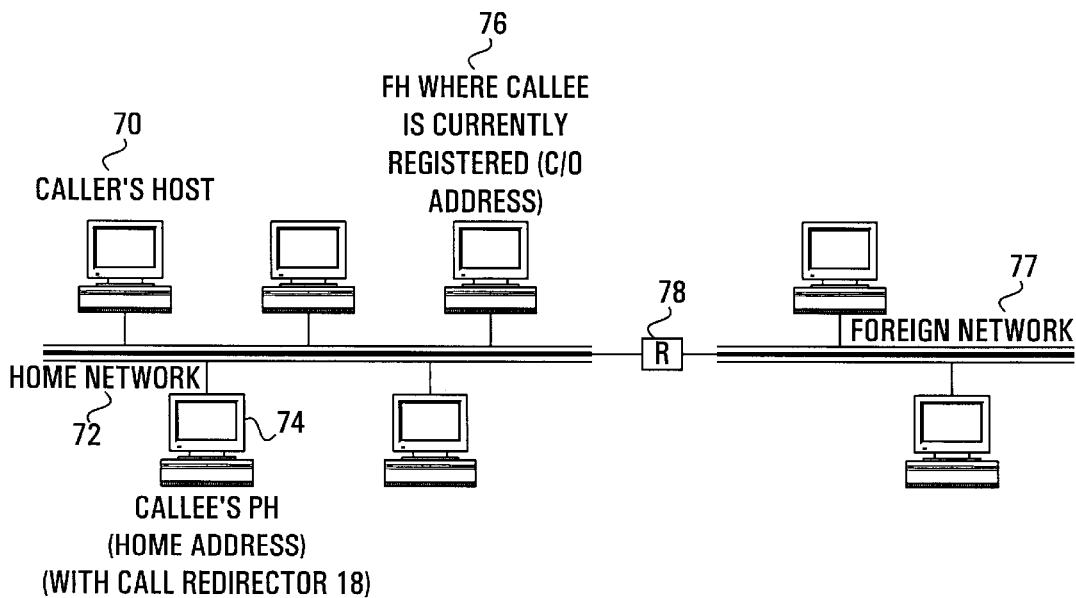
FIG. 3 is a schematic of a network on which personal mobility according to the invention may be implemented.

By way of example, in FIG. 3, a CH 70 is shown connected to its home network 72. The callee's PH 74 is shown connected to the same home network 72, and is equipped with the call redirector functional component 18. The FH 76 where the callee is currently registered (c/o address) is also shown connected to the same home network 72. Also shown is a foreign network 77 connected to the home network 72 through a connecting network including a router 78. More generally, a large number of home networks may be connected together through routers as subnetworks of a much larger network or may be connected together through routers as networks connected to the edge of a much larger network. The larger network may be the public Internet for example. The particular manner in which the callee's PH 74, the callee's FH 76, and the CH 70 are connected to the same home network is by way of example only. More generally, each of these devices may be connected to a different respective home network or subnetwork. The only requirement is that if different home networks are employed, that they be connected in a manner which permits multimedia calls to be placed between units connected to different networks.

Figure 4:
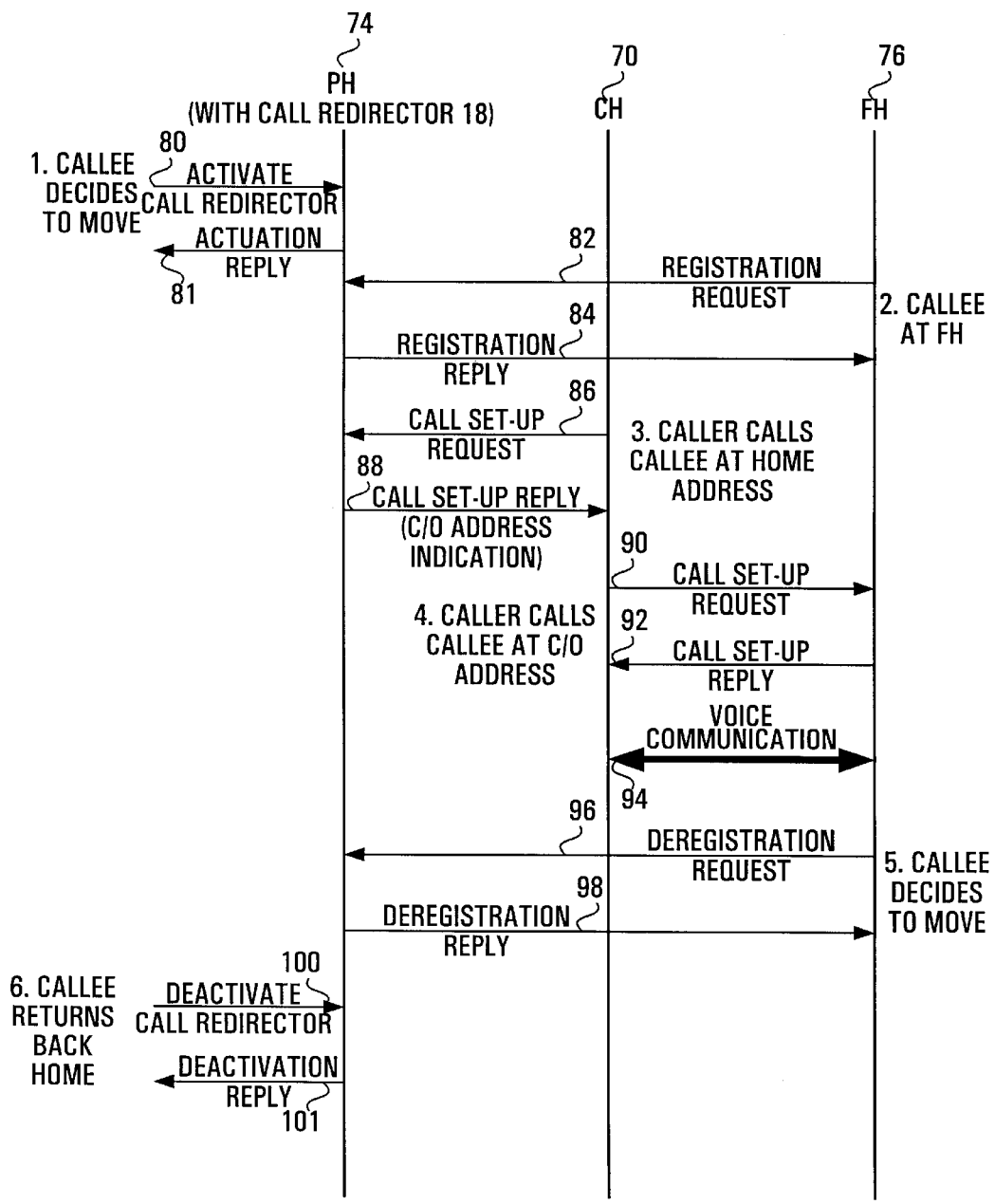
FIG. 4 is a signal flow diagram for personal mobility.

Referring now to FIG. 4, the sequence of steps executed to perform the personal mobility feature will be described. The signal flow lines 80 through 100 represent signalling or message flows between the CH 70, the callee's PH 74, and the FH 76.

Before the personal mobility feature is implemented, a callee would typically be at his/her PH 74. During this time, the call redirector 18 remains inactive, and all calls to the callee are received at his/her PH 74.

When a callee originally at his/her PH 74 decides to move to the FH 76, the callee activates the call redirector 18 to process both registration requests from the mobile callee and to process all call set-up requests destined to the callee's home address This is done by the callee submitting an activation command 80 through the base service GUI which in turn forwards the command to the call redirector 18. The call redirector 18 may return an activation reply 81 indicating that it is now active. The callee may then safely move from his/her PH 74 following activation. Calls continue to be received at the PH 74 until a registration request is received by the PH from a FH 76.

We assume now that the callee has moved to the FH 76 and has used the registration GUI provided by the base service on that machine to send a registration request 82 to his/her PH 74. The registration request 82 includes the address of the FH 76 which is to become the c/o address, and indicates that future calls are to be redirected to the FH. The call redirector 18 on the PH 74 receives this request and returns a registration reply 84.

Subsequent call setup requests 86 sent by a caller from a CH 70 to the callee's PH 74 are passed to the call redirector 18 within the PH for processing. The call redirector 18 will, in turn, initiate a call setup reply 88 to the CH 70 indicating the new c/o address at which the mobile callee can be reached, this being the address of the FH 76. The base service of the CH 70 receives this call setup reply 88, thereby determining the need to send a second call setup request 90 to the provided c/o address. The FH will receive the call setup request 90, accept the call and send a call setup reply 92 to the CH 70. At this point, the setup signalling steps required for the establishment of a multimedia call are completed.

After this the conventional additional steps referred to previously (negotiation, media channel establishment etc.) are performed eventually leading to a media stream connection such as a voice communication 94 between the CH 70 and the FH 76.

When the callee who has relocated to the FH 76 decides to initiate an outgoing call, a call setup request is sent from the FH to the destination IP address directly, using standard IP routing mechanisms.

When mobility services are no longer required, the mobile callee uses the registration GUI provided by the base service of the FH 76 to de-register his/her current c/o address originally registered with his/her PH 74. This is achieved through the exchange of a deregistration request message 96 and a deregistration reply message 98.

When the mobile callee moves to a different FH, the callee may register the address of that FH as the c/o address with his/her PH 74 through the exchange of another registration request and a registration reply message. Alternatively, when the mobile callee returns back to his/her PH 74, the callee may deactivate the call redirector 18 (100) to discontinue the personal mobility services.

Preferably, a callee may configure the call redirector 18 (residing on his/her PH) to selectively redirect calls to his/her new location, by following a screening procedure for example.

Also preferably, a callee may register with the call redirector 18 from his/her PH 74 if he/she knows in advance the IP address (c/o address) of the FH 76 he/she intends to move to.

The above description of personal mobility according to the invention has intentionally been independent of any standards/requirements which exist at present or which may exist in the future. However, provisions have been made within H.323 to allow endpoints to use supplementary services defined in Q.931 (ITU-T Recommendation Q.931, "Digital Subscriber Signalling System No. 1 (DSS1)—ISDN User-Network Interface Layer 3 Specification for Basic Call Control") and ISO QSIG Standard (QSIG refers to signalling at the Q-reference point, references for which include: ISO/IEC 11582, entitled "Information Technology—Telecommunications and information exchange between systems—Private integrated services network—Generic functional protocol for the support of supplementary services—Inter-exchange signalling procedures and protocol"; ISO/IEC 13872, entitled "Information technology—Telecommunications and information exchange between systems—Private integrated services network—Service description, functional capabilities and information flows—Diversion supplementary services"; and ISO/IEC 13873, entitled "Information Technology—Telecommunications and information exchange between systems—Private integrated services network—Inter-exchange signalling protocol—Call diversion supplementary services"). These standards provide for a call signalling channel and the Q.931 messaging protocol which may be used to create a specific implementation of the above described personal mobility feature together with the other features described herein below, these including terminal mobility and call distribution.

By way of example, such an H.323 specific realization of the personal mobility feature will now be described. Note that the description of the operation of supplementary services in H.323 is not yet standardized so that the details which follow may differ from the emerging standard. This implementation is targeted to an IP-based intranet/Internet. The H.225 (ITU-T Recommendation H.225, "Media Stream Packetization and Synchronization for Visual Telephone Systems on Non-Guaranteed Quality of Service LANs") FACILITY information element is used in accordance with ISO/IEC 13873 section 6.3.2. The FACILITY information element is conveyed in the messages as specified in ITU-T H.225.

In this context, the PMA consists of application software capable of processing information of QSIG messages. As indicated previously, the PMA is installed on the PH 74, FH 76 and the CH 70. A well known port number, called the PMA port is used to deliver and accept information elements to/from another PMA. The PMA may itself be a standalone piece of software, or be interfaced to the base service multimedia application which allows a user to send/receive voice, data, or video calls over an IP network. The PMA includes the call redirector functional component. The call redirector 18 on the callee's PH 74 maintains a registration lookup table which consists of the callee's ID, the c/o address of the FH 76 at which the mobile callee is currently located or anticipates being located, and optional screening fields. The callee may locally activate the call redirector 18 installed on the PH 74 prior to moving to a FH 76, or may do it remotely. If a call arrives at the PH 74 following activation of the call redirector 18, but prior to receiving a registration from the mobile callee, the call may be optionally sent to an auxiliary call handling platform such as a multimedia voice mail/answering machine, for example.

The PMA is made capable of processing the following QSIG operations:

divertingLegInformation2.inv: used to indicate to the mobile callee on the FH 70 that the received call is a redirected call;

divertingLegInformation3.rr: used to indicate to the caller on the CH 70 that the redirected call has been delivered to the mobile callee;

callRerouting.inv: used to request call redirection for a specific call; and callRerouting.rr: used to confirm the result of call redirection.

The PMA passes the following information elements to the call redirector 18 for processing:

activateDiversionQ.inv: used to indicate the registration request;

activateDiversionQ.rr: used to respond to the registration request;

deactivateDiversionQ.inv: used to indicate the deregistration request; and deactivateDiversionQ.rr: used to respond to the deregistration request.

Figure 5:
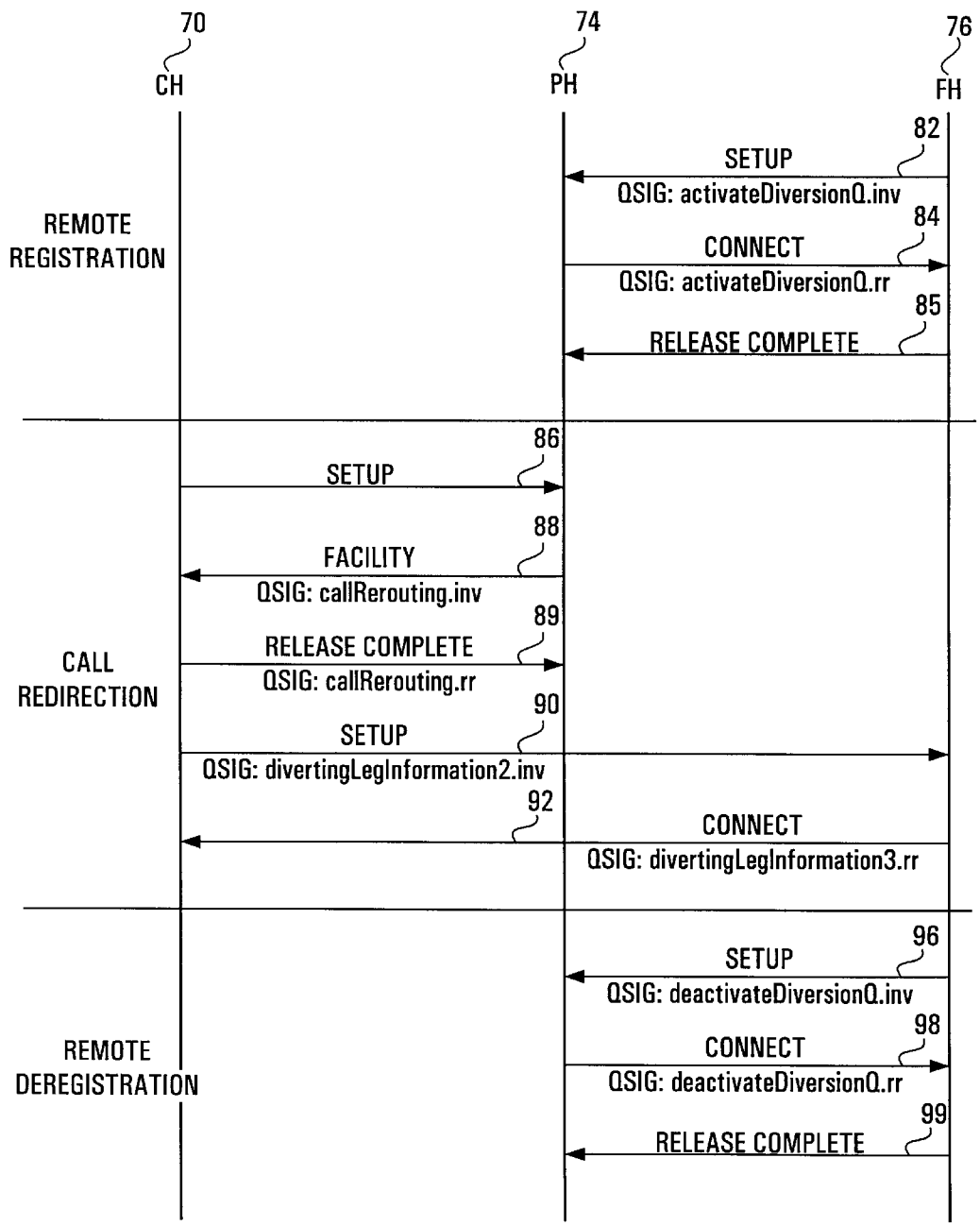
FIG. 5 is a signal flow diagram for a specific implementation of personal mobility.

FIG. 5 is a figure similar to FIG. 4 in which the particular message types required to implement each step in the particular QSIG/H.323 environment have been identified. Signal flows in FIG. 5 which are implementation specific functional equivalents of signal flows in FIG. 4 are shown having the same reference numbers.

Rather than providing a sequential description of what the steps are for implementing personal mobility, the actions which take place at each of the PH 74, CH 70, and FH 76 will now be described separately, starting with the PH.

To begin, the actions which occur at the PH 74 for remote registration will be described. Upon receipt by the PH 74 of an activateDiversionQ invoke APDU (application protocol data unit) in a SETUP message 82 from the FH, the call redirector 18 checks the authenticity of the mobile callee's ID and password elements in the received information element using some local verifying technique. If the mobile callee is successfully authenticated, the call redirector 18 replies with an activateDiversionQ return result APDU in a CONNECT message 84. The call redirector 18 will then register in the registration lookup table the mobile callee's ID, current c/o address, and other screening fields received in the SETUP message 82.

The actions which occur at the PH 74 upon deregistration will next be described. On receipt of a deactivateDiversionQ invoke APDU in a SETUP message 96, the call redirector 18 again checks the authenticity of the mobile callee. If authentication is successful, the call redirector 18 answers the setup message with a deactivateDiversionQ return result APDU in a CONNECT message 98. The call redirector 18 will then remove from the registration lookup table the information pertaining to the registration of the mobile callee.

Next the actions which occur in the PH 74 once the call redirector 18 has been activated will be described. Once the call redirector 18 is activated, the information elements in all setup messages 86 received by the PH are examined by the PMA. If any received messages pertain to actual call setup rather than non call-associated signalling, the call redirector 18 will look up the registration lookup table. if the mobile callee has already registered his/her current c/o address, the call redirector 18 may use a local call screening technique to decide whether or not to provide the caller with the mobile callee's c/o address. The screening fields associated with the c/o address in the table entry is used for this purpose. If the caller is successfully screened, the PH 74 sends a callRerouting invoke APDU in a FACILITY message 88. The callRerouting information element contains the mobile callee's current c/o address along with any other required information elements. The PH 74 then receives a callRerouting return result APDU in a RELEASE COMPLETE message 89 confirming reception of the c/o address by the CH 70.

The actions which occur at the CH 70 will now be described. Upon receipt of a callRerouting invoke APDU in a FACILITY message 88 received from the PH 74, the CH 70 answers back with a callRerouting return result APDU in a RELEASE COMPLETE message 89. This RELEASE COMPLETE message 89 also terminates the call to the PH 74. The CH 70 then optionally notifies the caller that the call has been redirected and the corresponding c/o address to which the call is to be redirected.

The CH 70 then initiates the establishment of a new call to the new c/o address. The setup message 90 for the new call establishment includes a divertingLegInformation2 invoke APDU along with other necessary information elements.

On receipt of a divertingLegInformation3 return result APDU in a connect message 92, the caller is notified of the success of the redirection if the additional information elements in the message satisfy any imposed conditions.

Next, the actions which occur at the FH 76 will be described. On receipt of an internal registration request from the mobile callee (via the PMA), the FH 76 sends an activateDiversionQ invoke APDU in a SETUP message 82 to the PH 74. An "internal message" is a message which is not received from a remote terminal but which results locally from the action of a user. The activateDiversionQ information element includes the mobile callee's ID, access password, current c/o address, desired screening fields, and other elements. On receipt of the activateDiversionQ return result APDU in a CONNECT message 84 from the PH 74, the mobile callee is notified of the successful registration. The FH 76 then terminates the call with the PH 74 using a release complete message 85.

On receipt of an internal deregistration request from the mobile callee (again via the PMA), the FH 76 sends a deactivateDiversionQ invoke APDU in a SETUP message 96 to the PH 74. The deactivateDiversionQ information element again includes the mobile callee's ID, access password, current c/o address, and other elements. On receipt of the deactivateDiversionQ return result APDU in a CONNECT message 98 from the PH 74, the mobile callee is notified of the successful deregistration. The FH 76 then terminates the call with the PH 74 using a RELEASE COMPLETE message 99. On receipt of a divertingLegInformation2 invoke APDU in a SETUP message 90, the FH 76 notifies the mobile callee regarding the incoming call from the CH 70. IN return, the FH sends a divertingLegInformation3 invoke APDU in a CONNECT message 92 back to the CH 70. The divertingLegInformation3 indicates the c/o address and whether its presentation to the caller on the CH 70 is restricted or not, in addition to other elements.

The second embodiment of the invention, referred to as terminal mobility, will now be described with reference to FIGS. 6 and 7, and a specific implementation for the previously referenced protocols and standards will be explained with reference to FIGS. 8 and 9. Terminal mobility provides the ability for a callee having a portable computer normally connected to a terminal at a home address to move to a new location with their portable computer and reconnect it there, and to receive multimedia calls at the new location which were initially directed towards their home address. To begin, several additional terms will be defined. The terms defined previously in relation to personal mobility have the same definitions in this context, and these definitions will not be repeated here.

A hardware address is a 48 bit address which identifies the network interface of a host connected to the Ethernet.

A MH (Mobile Host) is a personal host which changes its point of attachment from one point in a network or subnetwork to another.

A SH (Shadow Host) is a stationary host which remains attached to the home network of the MH in order to intercept and redirect calls destined to a mobile callee when the callee moves with his/her MH. As discussed in further detail below, the callee may choose any stationary host on the home network to serve as his/her SH.

ARP (Address Resolution Protocol) refers to a network interface layer protocol that binds an IP address to the hardware address of a host. A Gratuitous ARP message is a local broadcast message that updates the ARP caches of all hosts connected to the home network to reflect the binding between the desired IP address in the message and the hardware address of the host broadcasting the message.

A packet handler is a piece of software that resides on the SH to enable it to intercept and process incoming packets destined to the callee's home address. The packet handler interfaces with the SH's IP stack for this purpose. Also, the call redirector 18 triggers the packet handler in order to initiate gratuitous ARP messages.

Note that for IP-based networks, a technique known as IP aliasing allows a single physical interface/port of a shadow host terminal to respond to two or more IP addresses, the first being the terminal's own IP address, and the others being one or more IP alias addresses. IP aliasing may be achieved by installing an operating system specific software which assigns multiple IP addresses to a single physical port. Packets destined to each of the IP alias addresses will be handled by an individual server process. IP aliasing may be used to assign the home address as an additional IP alias address to the SH's physical port.

A TMA (terminal mobility application) is a piece of software which is a special version of the base service which is capable of processing messages required to implement terminal mobility. The TMA is installed on the SH, the MH and the CH, and is similar in function to the previously described PMA.

Terminal mobility provides the ability of a callee to move along with his/her MH to a foreign network and still be able to access his/her personal communication services. The current invention relates to an application layer terminal mobility service capability that makes use of the above described call redirection signalling procedure to have a voice, data, or video call, originally destined to a callee's home address, to be redirected to the callee's current c/o address on the foreign network. The procedure is performed by the call redirector functional component residing within the SH. While the SH must be attached to the home network, the callee's MH may be attached to any subnetwork other than the home network within the IP-based network.

Following activation of the call redirector 18 on the SH 122, the SH broadcasts Gratuitous ARP messages on the home network in order to bind the MH's home address to the SH's hardware address once the MH moves away from the home network. The function of this is to let hosts/routers on the same home network know that the SH is to handle the initial call signalling for calls directed to the callee's home address. The SH (with the packet handler) then intercepts all call request packets destined to the home address and alerts the call redirector on the SH for processing. The call redirector, in turn, provides the caller with the c/o address of the callee on the foreign network. The caller may now contact the mobile callee by sending the call request directly to the callee's c/o address. Note that the signalling procedure involved to achieve terminal mobility is transparent to both the caller and the callee.

The current embodiment of the invention offers an end user new opportunities to detach his/her MH and roam across multiple subnetworks while still being able to send and receive multimedia calls. It provides a flexible (in terms of being able to access an end-user's personal communication services from anywhere, anytime) and reliable (since call signalling and call path is over a wire-line intranet/Internet) application layer service capability that may be integrated with emerging multimedia base services through proper interfaces.

The callee may choose any host on his/her home network to serve as the SH. The callee need only ensure that the call redirector and the packet handler are installed on the chosen SH prior to roaming. The callee may then specify (based on any preferred criteria) the c/o address to which his/her personal calls should be redirected by either locally or remotely configuring the call redirector on the SH.

Figure 6:
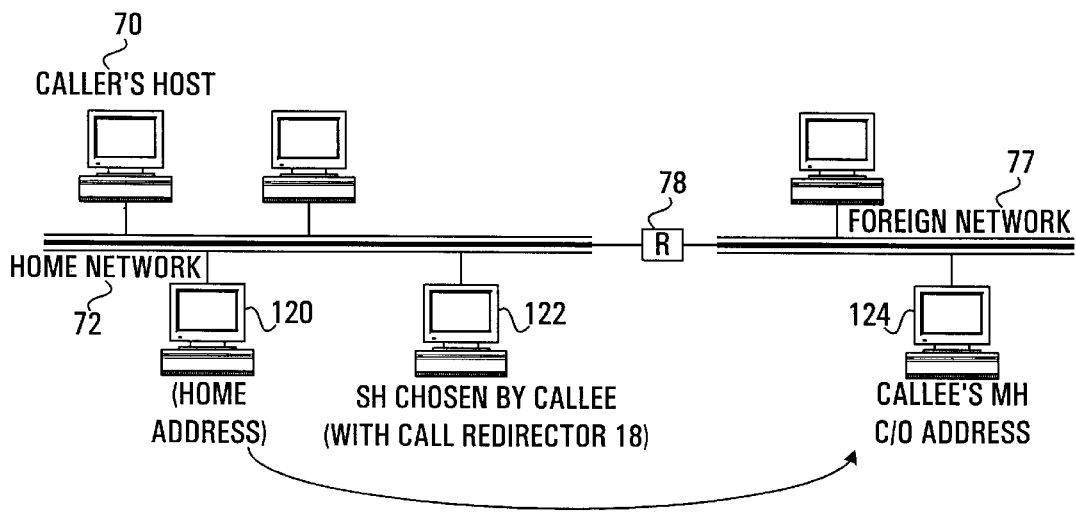
FIG. 6 is a schematic of a network on which terminal mobility according to the invention may be implemented.

By way of example, in FIG. 6, the callee has a MH which has a home address 120 on a home network 72 represented by a terminal shown in phantom, indicating that the MH is not actually connected at its home address. A CH 70 is shown connected to the same home network 72. Another terminal on the same home network 72 has been designated as the SH 122 and is equipped with the call redirector functional component 18 and the above described packet handler functionality. The callee's MH 124 is shown connected to a foreign network 77 and has a c/o address which is registered with the SH 122.

Figure 7:
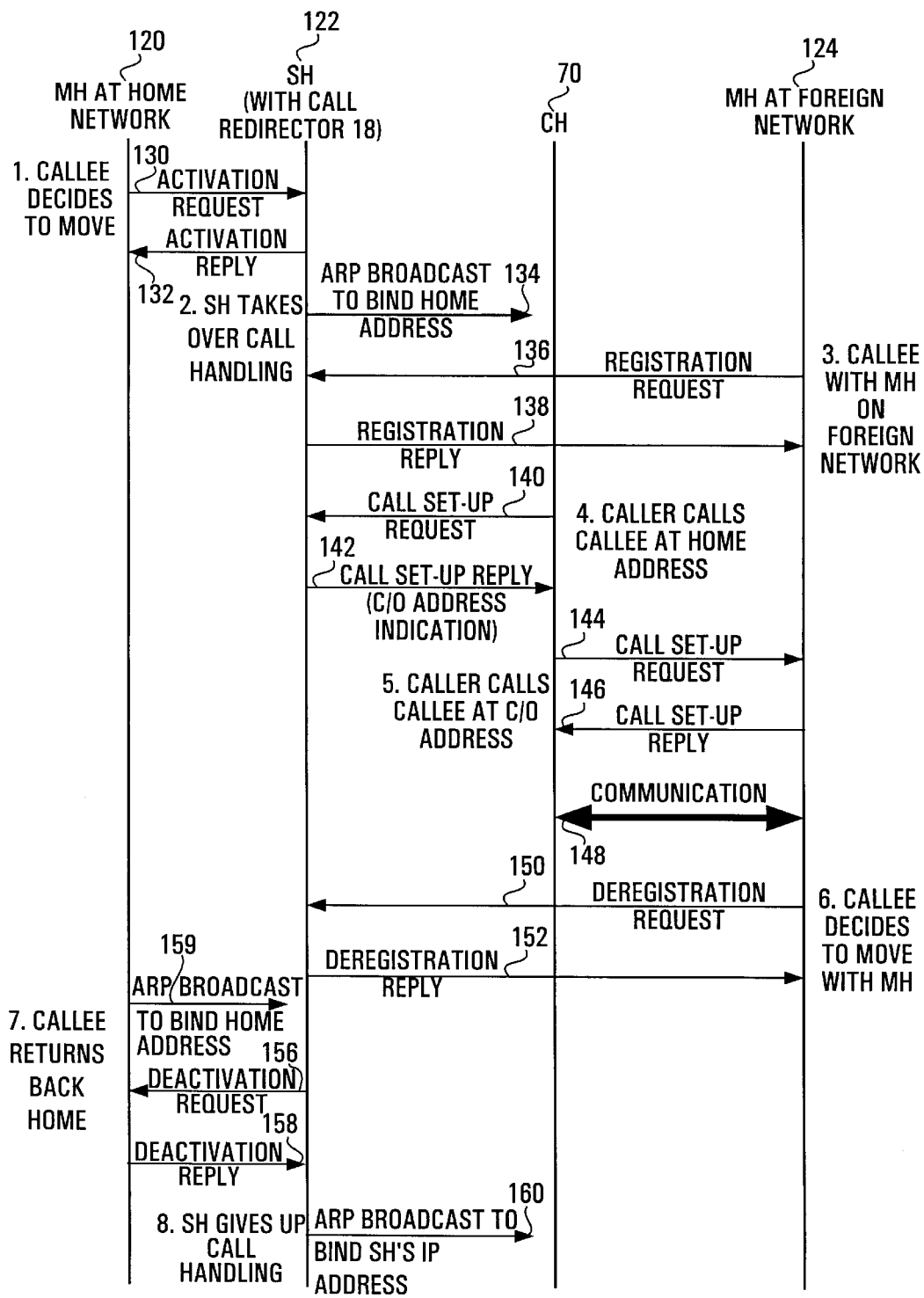
FIG. 7 is a signal flow diagram for terminal mobility.

Referring now to FIG. 7, the steps involved with executing terminal mobility according to the invention in an IP based Intranet/Internet environment will be described. The signal flow lines 130 through 160 represent signalling or message flows between the MH when connected to the home address 120, the CH 70, the MH 124 when connected to the foreign network 77, and the SH 122.

When a callee's MH is connected to the home address 120 in the home network 72, the call redirector 18 within the SH 122 remains inactive (i.e. the callee operates without any mobility services).

When a callee originally connected to the home network 72 decides to move along with his/her MH, the callee activates the call redirector 18 within the SH 122 by sending an activation request 130 to the SH. The base service of the SH 122 receives the activation request 130 and activates the call redirector 18. There is no requirement for any physical interaction with the SH 122 by a user. If another party is using the SH 122 at that time, there is no need to interrupt them to inform them of the fact that the call redirector 18 has been activated. In response to the activation request, the call redirector 18 sends an activation reply 132 to the MH confirming that the call redirector 18 has been activated. The callee may safely detach his/her MH from the home address 120 upon reception of this message. The SH 122 is now prepared to process both registration requests from the mobile callee and all call set-up requests destined to the callee's home address while the callee is mobile.

The call redirector 18 then triggers the packet handler to send a gratuitous ARP broadcast message 134 on the home network to bind the callee's home address to the SH's hardware address so that the SH 122 may intercept and process all call set-up requests destined to the callee's home address 120 while the callee is mobile. This broadcast message 134 will automatically update the ARP caches on each host attached to the home network 72 to reflect the binding. It is recommended that this broadcast message 134 be repeated at least three times for reliability purposes. From then onwards, the SH 122 impersonates the MH.

Once the callee has attached his/her MH 124 to a foreign network 77, the callee uses the registration GUI provided by the base service to register his/her c/o address with the SH 122. The registration is-performed through the exchange of a registration request message 136 and a registration reply message 138.

Note that the c/o address may be automatically assigned to a callee's MH 124 by a Dynamic Host Configuration Protocol (DHCP) host connected to the foreign network 77 (not shown).

During the period that the MH 124 is in transit, and is not connected to any network, the SH may be configured to forward calls intercepted for the MH 124 to an auxiliary call handling platform such as a multimedia voice mail server for example.

A call set-up request 140 sent by the CH 70 to the callee's home address will now be intercepted by the SH 122 and passed onto the call redirector 18 for processing. The call redirector 18 will, in turn, initiate a call set-up reply 142 to the CH 70 indicating the new c/o address at which the mobile callee can be reached. The CH 70 will now use this c/o address to initiate a call set-up request 144 directly to the callee's c/o address. At this point, the setup signalling steps required for the establishment of a multimedia call are completed. After this the conventional additional steps referred to previously (negotiation, media channel establishment etc.) are performed eventually leading to a media stream connection such as a voice communication 148 between the CH 70 and the MH 124.

When the mobile callee decides to initiate an outgoing call, a call set-up request is sent directly from the MH to the destination IP address using standard IP routing mechanisms.

When mobility services are no longer required, the mobile callee uses the registration GUI provided by the base service to de-register his/her current c/o address originally filed with the SH 122. The de-registration is performed through the exchange of a deregistration request message 150 and a deregistration reply message 152.

When the mobile callee moves to a different foreign network, the callee may re-register his/her new c/o address with the SH 122 through the exchange of another registration request and a registration reply message. Following re-registration, any old c/o address registered with the SH 122 will be over-written by the new c/o address (in case the callee moved to the new foreign network without de-registering).

When the mobile callee returns home and plugs back his/her MH into the home network 72, the callee's MH sends gratuitous ARP messages 154 (during bootstrapping) to bind the callee's home address 120 to the MH's hardware address itself. The callee then deactivates the call redirector 18 on the SH 122 to discontinue the terminal mobility services through the exchange of a deactivation request message 156 and a deactivation reply message 158.

Following deactivation, the call redirector 18 triggers the packet handler to send a gratuitous ARP broadcast 160 on the home network to bind the SH's IP address back to the SH's hardware address. It is recommended that this broadcast be repeated at least three times for reliability purposes. All call set-up requests destined to the callee's home address 120 will no longer be intercepted by the SH 122.

By way of example, a specific realization of the terminal mobility feature according to the invention for the same specific context described previously for personal mobility will now be described with reference to FIGS. 8 and 9.

In this context, the TMA is a piece of application software capable of processing information elements of QSIG messages. As mentioned previously, the TMA must be installed on the SH 122, the MH 124, and the CH 70. A well known port number, called the TMA port, is used to deliver and accept information elements to/from other TMAs. The TMA may itself be a standalone piece of software, or form part of the multimedia base service application that allows a caller/callee to send/receive voice, data, or video calls over an IP network. The TMA includes a packet handler functional component and a call redirector functional component. The call redirector 18 allows all or specific incoming calls (following an optional screening process) destined to the home address of the mobile callee to be redirected back to the caller and subsequently to the callee's MH. The redirected call carries the c/o address at which the mobile callee is currently located. For this purpose the call redirector 18 maintains a registration lookup table as described previously with reference to the personal mobility embodiment. The callee remotely activates the call redirector 18 installed on the SH 122 prior to moving to a foreign network 77.

The TMA is made capable of processing the information elements of QSIG messages previously described with reference to the PMA in the personal mobility embodiment, and is also capable of processing the following information elements which do not presently exist in QSIG, but are new elements provided according to the invention:

activateCR.inv: Used to activate the call redirector 18 within the SH;

activateCR.rr: Used to confirm the results of activating the call redirector 18;

deactivateCR.inv: Used to deactivate the Call redirector 18 within the SH; and deactivateCR.rr: Used to confirm the results of deactivating the call redirector 18.

The TMA passes the following information elements to the call redirector 18 for processing: activateDiversionQ.inv; activateDiversionQ.rr; deactivateDiversionQ.inv; deactivateDiversionQ.rr, these being the same information elements the PMA passes to the call redirector 18.

Figure 8:
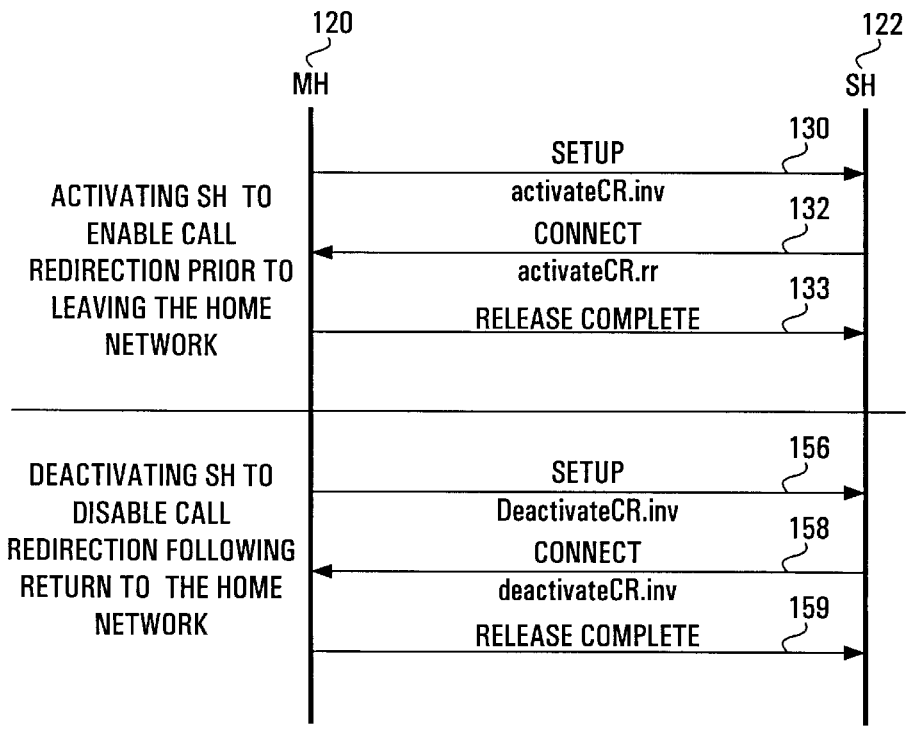
FIGS. 8 and 9 are signal flow diagrams for a specific implementation of terminal mobility.
Figure 9:
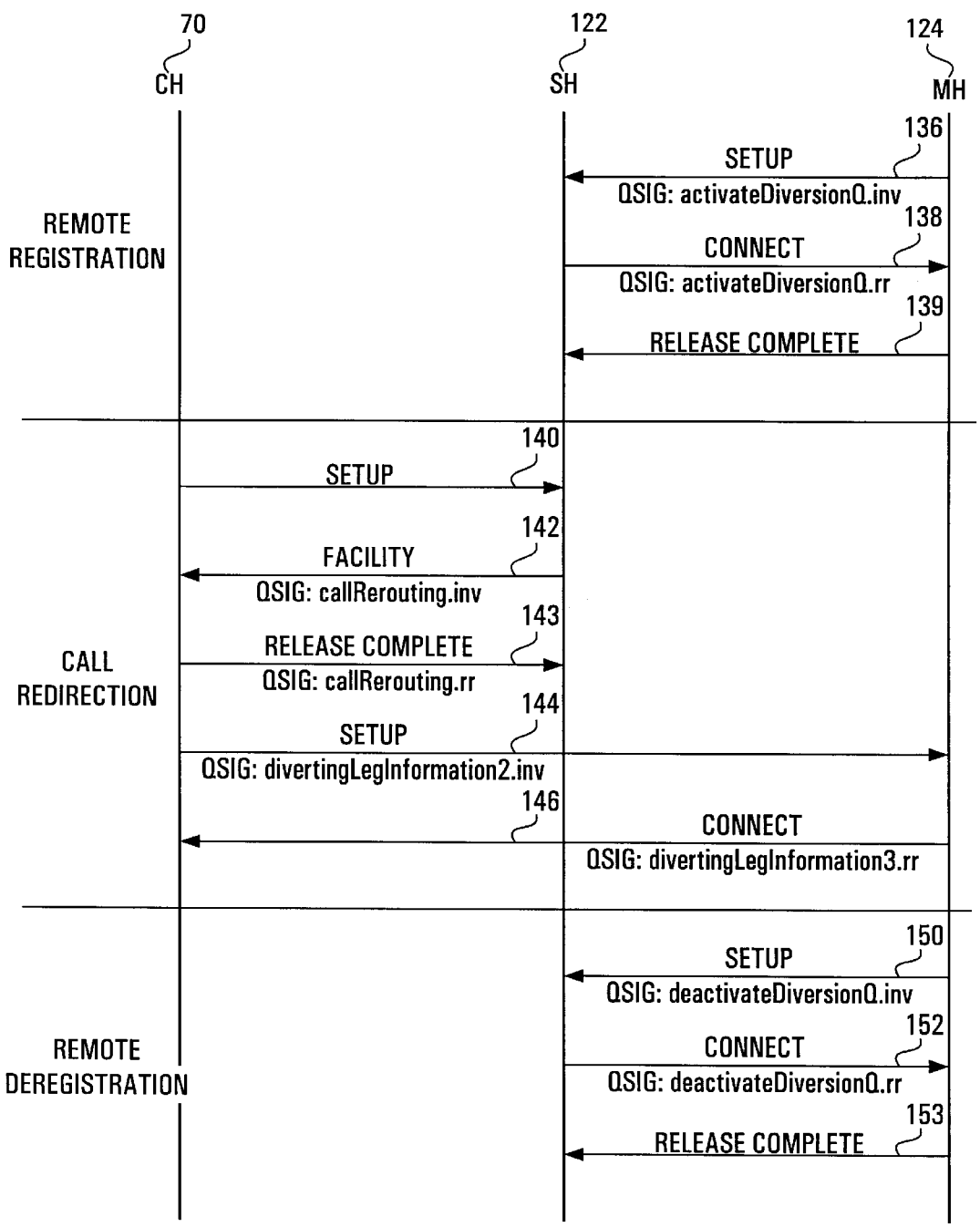

FIGS. 8 and 9 together are similar to FIG. 7, but in which the particular message types required to implement each step in the particular QSIG/H.323 environment have been identified. Signal flows in FIGS. 8 and 9 which are implementation specific functional equivalents of signal flows in FIG. 7 are shown having the same reference numbers.

The actions which take place at each of the MH 124, CH 70, and SH 122 will now be described, starting with the SH 122, and particularly with the actions which take place during activation/deactivation of the call redirector functional component on the SH.

On receipt of a activateCR invoke APDU in a SETUP message 130, the TMA on the SH 122 examines the information elements received in the message, and in particular the caller ID and password elements, and performs authentication on these. If successfully authenticated, the TMA shall activate the call redirector 18 in the SH 122. The TMA then sends an activateCR return result APDU in a CONNECT message 132 to the MH 124. Note the mobile callee has his/her MH 124 connected to its home address 120 on the home network 72 at this time. Upon receipt of a RELEASE COMPLETE message 133 from the MH, the call redirector 18 instantiates a packet handler to intercept and process all packets destined to the mobile callee's home address 120. Once activated, the call redirector 18 on the SH processes information elements related to registration/deregistration in the same manner as the PH 74 processes information elements related to registration/deregistration for the above described personal mobility embodiment, using the same QSIG commands. This will not be repeated here.

Once the call redirector 18 in the SH has been activated, the information elements in all SETUP messages subsequently received by the SH 122 are examined by the TMA. If the received information elements are neither an activateCR or deactivateCR, and neither an activateDiversionQ or deactivateDiversionQ, the call redirector 18 consults the registration lookup table. If the mobile callee has already registered his/her current c/o address, the call redirector 18 shall use some local call screening technique to decide whether or not to provide the caller with the mobile callee's c/o address. The screening fields associated with the c/o address in the table entry shall be used for this purpose. If the caller is successfully screened, the SH 122 shall send a callRerouting invoke APDU in a FACILITY message 142. The callRerouting information element contains the mobile callee's current c/o address along with other elements. The SH 122 then receives a callRerouting return result APDU in a RELEASE COMPLETE message 143 confirming reception of the c/o address.

The actions which occur at the CH 70 will now be described. A caller wishing to make a call to the mobile callee sends a SETUP message 140 to the mobile callee's home address. The caller is unaware of the current location of the mobile callee during the initial call establishment to the mobile callee. On receipt of a callRerouting invoke APDU (containing the current c/o address of the mobile callee) in a FACILITY message 142 from the SH 122, the CH 70 sends a callRerouting return result APDU in a RELEASE COMPLETE message 143. The RELEASE COMPLETE message sent by the CH 70 will also terminate the call to the SH 122. The CH 70 may optionally notify the caller that the call has been redirected and indicate the corresponding c/o address to which the call is to be redirected if the restriction elements received in the callRerouting invoke APDU 142 permits it to do so.

Once the caller has been notified, the CH 70 initiates a new call establishment to the new c/o address. The SETUP message 144 for the new call establishment includes a divertingLegInformation2 invoke APDU along with other necessary information elements.

On receipt of a divertingLegInformation3 return result APDU in a CONNECT message 146, the caller shall be notified regarding the success of the redirection if the additional information elements in the message permits it to do so.

Next, the actions which take place at the MH 124 both while connected to its home address 120, and while connected in a remote location in a foreign network 77 will be described. On receipt of an internal (intra-node) activation request from the mobile callee (via the TMA), the MH shall send a activateCR invoke APDU in a SETUP message 130 to the SH 122. The activateCR information element includes the mobile callee's ID, access password, and other elements. On receipt of the activateCR return result APDU in a CONNECT message 132 from the SH 122, the mobile callee is notified of the successful activation of the call redirector 18 within the SH. The MH 120 then terminates the call with the SH 122 using a RELEASE COMPLETE message 133. The mobile callee may now move to a foreign network along with his/her MH.

On receipt of an internal (intra-node) deactivation request from the mobile callee (via the TMA), the MH shall send a deactivateCR invoke APDU in a SETUP message 156 to the SH 122. The deactivateCR information element again includes the mobile callee's ID, access password, and other elements. On receipt of the deactivateCR return result APDU in a CONNECT message 158 from the SH 122, the mobile callee is notified of the successful deactivation of the call redirector 18. The MH then terminates the call with the SH 122 using a RELEASE COMPLETE message 159. All packets destined the mobile callee's home address 120 will no longer be intercepted by the SH.

It is now assumed that the MH 124 is reconnected to a foreign network 77. On receipt of an internal registration request from the mobile callee (via the TMA), the MH 124 sends an activateDiversionQ invoke APDU in a SETUP message 136 to the SH 122. On receipt of the activateDiversionQ return result APDU in a CONNECT message 138 from the SH 122, the mobile callee is notified of the successful registration. The MH 124 then terminates the call with the SH 122 using a RELEASE COMPLETE message 139.

On receipt of an internal deregistration request from the mobile callee (via the TMA), the MH 124 sends a deactivateDiversionQ invoke APDU in a SETUP message 150 to the SH 122. On receipt of the deactivateDiversionQ return result APDU in a CONNECT message 152 from the SH 122, the mobile callee is notified of the successful deregistration. The MH 124 then terminates the call with the SH 122 using a RELEASE COMPLETE message 153.

On receipt of a divertingLegInformation2 invoke APDU in a SETUP message 144, the MH 124 notifies the mobile callee regarding the incoming call from a CH 70. In return, the MH 124 sends a divertingLegInformation3 invoke APDU in the CONNECT message 146 back to the CH 70. The divertingLegInformation3 indicates the c/o address and whether its presentation to the caller on the CH 70 is restricted or not, in addition to other elements.

Note that the MH 124 may be assigned a c/o address automatically by a Dynamic Host Configuration Protocol (DHCP) host on the foreign network 77.

Figure 11:
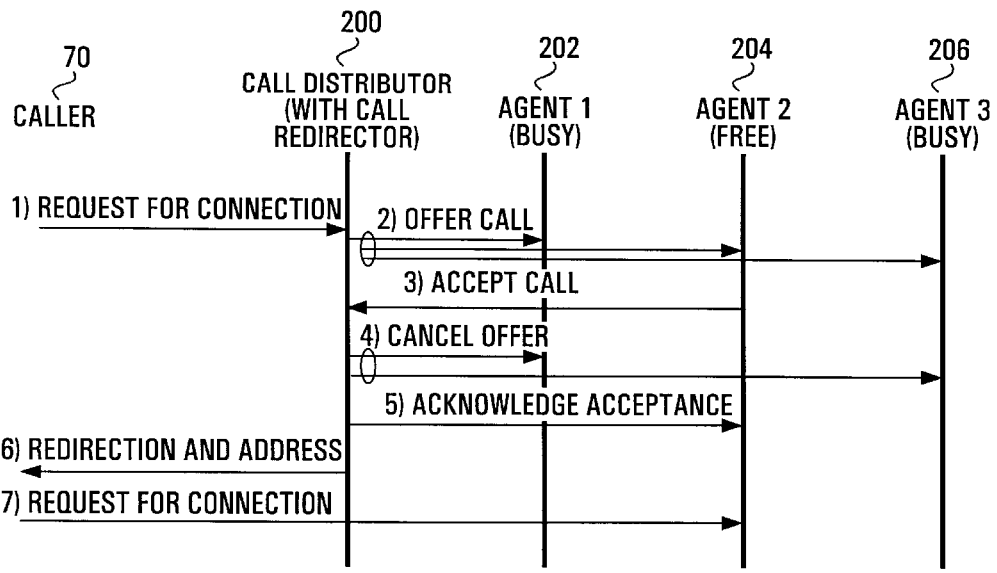
FIG. 11 is a signal flow diagram for a first type of automatic call distribution according to the invention.
Figure 12:
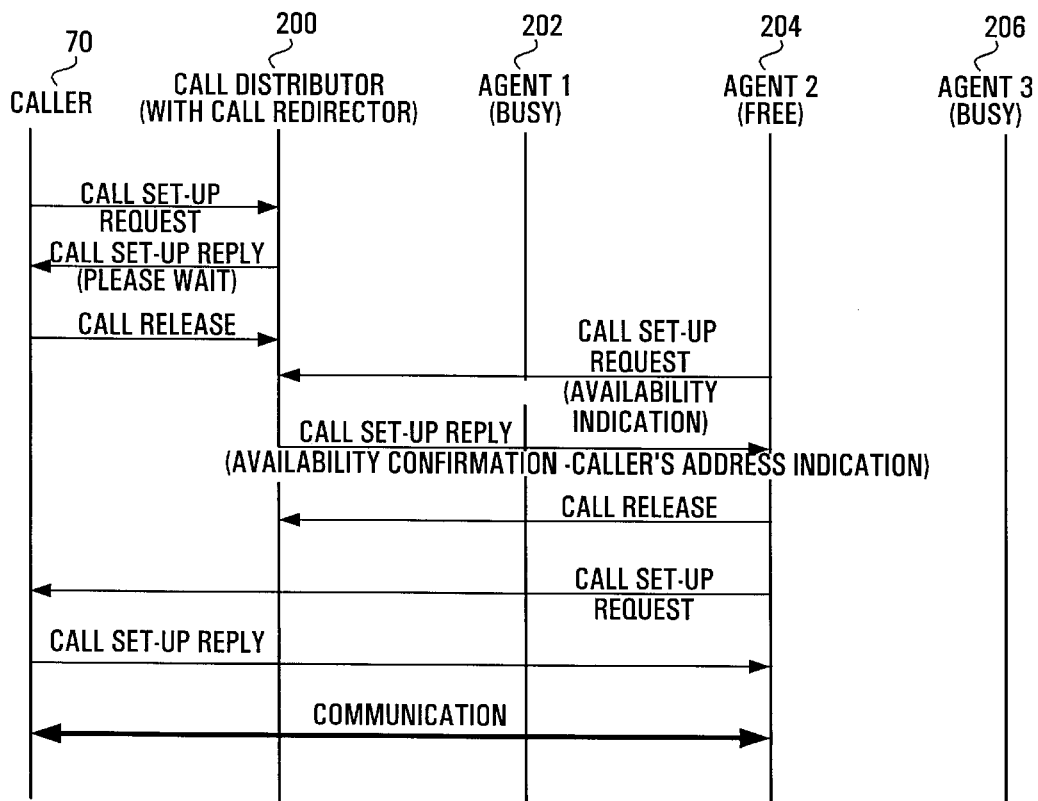
FIG. 12 a signal flow diagram for a second type of automatic call distribution according to the invention.

A third embodiment of the invention will now be described with reference to FIGS. 10, 11 and 12. The third embodiment of the invention provides a series of call distribution methods.

The solutions described below for call distribution are unique because the selection of a specific peer to receive a call is achieved through communication among the peer computing devices. Traditional call distribution schemes require a server device that receives the call and distributes it to one of many clients using its knowledge of the status and history of each client. In addition, the call is routed to the client through the server. Thus, the number of calls that can be managed is determined by both the number of agents and the capacity of the server.

It is possible for the computing device receiving an initial request to forward the packets to the computing device which will handle the call. Such a solution is analogous to the server-client solution present in today's switched voice network. However, this solution has two undesirable results.

1) The server becomes a bottle neck. All media stream packets travel through it. As the number of clients increase, the bandwidth to the server must increase. The current invention circumvents this problem because a coordinating computing device, which is in fact one of the peer computing devices, receives only the call signalling packets. It is not involved in the higher volume of media stream packets that will occur once the call setup is complete.

2) The action of forwarding the packets to a client takes time. Delay is a critical issue in packet telephony. Bypassing an intermediary, the server, means the packet's travel time is not increased by the handling of a server that reroutes the packets.

It is noted that in packet telephony, call distribution schemes can be differentiated according to whether or not a media stream connection is already established between the calling terminal and the receiving terminal before the caller is connected to an agent terminal that will actually handle the call. Receiving a media stream implies a media stream connection is already established between the calling terminal and the receiving terminal. The invention can support either scheme with only minor variations in the messaging sequence. In either case, a call signalling channel is setup between the calling terminal and the receiving terminal. The alteration involves the use of a call transfer message if a media stream connection is established vs. the use of a call diversion message should no media stream connection be established, in which case only a call signalling connection is established between the calling and receiving terminal.

Figure 10:
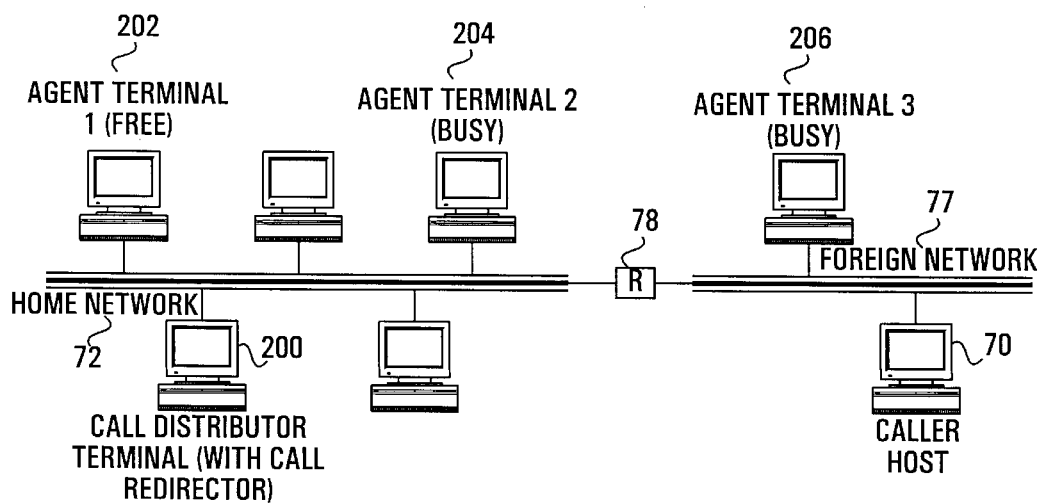
FIG. 10 is a schematic of a network on which automatic call distribution according to the invention may be implemented.

Referring firstly to FIG. 10, which is an exemplary network schematic for an implementation of the call distribution embodiment of the invention, shown is a calling terminal or CH 70 connected to a foreign network 77, a CRDT (call receiving and distributing terminal) 200 also referred to as a receiving terminal connected to a home network 72 and equipped with a call redirector functional component, and four agent terminals 200,202,204,206 three of which are connected to home network 72, and one of which is connected to foreign network 77. Foreign network 77 is the home network of agent terminal 206. The CRDT 200 and the agent terminal 200 are the same physical device and thus have the same reference number but they may alternatively be implemented as separate devices. The CRDT 200 and the agent terminals 200,202,204,206 have a messaging capability which allows informational messages not directly related to the setup and termination of calls to be transmitted and received between these devices. In any case, these messages will be referred to as "information messages".

It is to be understood that the particular manner in which the CH 70, and the agent terminals 200,202,204,206 are connected to the home network 72 and the foreign network 77 is by way of example only. More generally, a large number of home networks may be connected together through routers as subnetworks of a much larger network or may be connected together through routers as networks connected to the edge of a much larger network. The larger network may be the public Internet for example. Each of these devices may be connected to a different respective home network or subnetwork. The only requirement is that if different home networks are employed, that they be connected in a manner which permits multimedia calls to be placed between units connected to different networks.

Call distribution will first be described for the case where no media stream connection is established between the calling terminal 70 and the CRDT 200. The roles of the calling terminal 70, the CRDT 200, and the agent terminals 200,202,204,206 will now be described. A specific one of the agent terminals 200,202,204,206 will be referred to as terminal x.

The calling terminal 70 sends call set-up requests to "Help Desk", receives a diversion message to send the call to terminal x, sends a call set-up request to terminal x, receives a connection message from terminal x, replies to terminal x resulting in the establishment of a media stream connection, and sends disconnect messages to the CRDT 200.

The CRDT 200 receives set-up requests from the calling terminal 70, executes call distribution logic, sends an information message that a call is being diverted to terminal x, sends a diversion message to calling terminal, receives a disconnect message from calling terminal 70.

Terminal x receives an information message that a call is being diverted to the terminal, acknowledges the information message with another information message, receives setup request from the calling terminal 70, sends a setup reply to the calling terminal, media stream path established.

The message sequence is summarized in the following table:

| CALLING TERMINAL | RECEIVING TERMINAL | TERMINAL x |
|---|---|---|
| Call Set-up request to "Help Desk" at address Receiving Terminal | Receives Call Set-up to "Help Desk" from Calling Terminal Execute Call Distribution Logic | |
| | Send message to Terminal x | Receive message from Receiving terminal |
| Receive Diversion message | Send Call Diversion message | |
| Send Call Set-up to Terminal x | | Receive Call Set-up from Calling Terminal |
| Receive Connection message from Terminal x | | Send Connection message to Calling Terminal |
| Send Disconnect message to Receiving Terminal | Receive Disconnect message from Calling Terminal | |
| Voice path established with Terminal x | | Voice path established with Terminal x |

The call distribution logic is performed on the CRDT, and selects the terminal to which the call is to be offered or directed. The specific logic may emulate many forms of distribution that are currently supported by today's switched voice networks, including for example hunt group logic, and ACD (automatic call distribution) logic.

Hunt group call distribution logic sends the call to a single terminal according to a number of criteria including circular, and longest idle. With the circular criterion, all terminals that have indicated their willingness to accept calls are placed in a list. Each successive call is offered to the next available terminal on the list. With the longest idle criterion, the logic sends the call to the terminal that has been idle longest. This logic implies that each terminal of the hunt group informs the distributing terminal when it is free and that information is recorded on the list of available terminals.

ACD logic is a more complex than Hunt Group logic. ACD logic can organize the receiving terminals into subgroups according to the skills of the agents registered at each terminal. Thus, each call can be analysed and sent to a specific sub-group according to some criteria such as the caller's address.

The call distribution logic may be "agent based" or "caller based". With "agent based" call distribution, the CRDT 200 provides terminal x with a diversion message that indicates the at terminal x is to send a call setup request to the calling terminal 70. With "caller based" call distribution, the CRDT 200 provides the caller with a diversion message that indicates the calling terminal is to send a call setup request to terminal x.

An example of the invention will be described in a stepwise manner by way of example with reference to FIG. 11. In this example, a distributor based call distribution logic is employed which offers a call to each of the agents and waits for a call acceptance before deciding which agent is to receive the call and subsequently diverting the call. It is assumed that each of the agent terminals 200,202,204,206 are staffed by agents in the employment of a company ABC.

1) A caller on a CH 70 wants to speak with some one at company ABC. They initiate a packet voice call to the company's public packet address, by sending a call setup request message. That address is the address of the CRDT 200, but as indicated above, that computing device also serves the needs of an agent of company ABC. The public address may be the address of a help desk for example. The call setup request contains a user-to-user data field indicating the name of the called party, "help desk" in this case.

2) The CRDT 200 receives the call setup request and analyzes the information within the call setup request to determine the connection is for the company ABC, and not specifically for the agent staffing the agent terminal 200. This determination activates the call distribution service installed as software on CRDT 200.

The CRDT 200 has call distribution logic which determines which members of the company should be offered the call. The selected members are sent a call offer message that contains information describing the call. In the illustration of FIG. 11, it is assumed that the agents staffing each of is agent terminals 202,204,206 are to be offered the call.

3) The call offer information is displayed on each agent's terminal. Any of the agent's receiving the offer can elect to accept the call. Upon indicating their acceptance, their computing device sends a call acceptance message to 20 originator of the offer, namely the CRDT 200. Each agent offered the call can also ignore the offer or reject the offer.

4) The CRDT 200 collects all acceptance messages for a user controllable time, and then uses its call distribution logic to determine to which computing device the call will be redirected, on the basis of any accept call messages received from the agent terminals. It may be that more than one terminal accepts the call, and a decision as to which terminal is to get the call must be made in this case. There are a number of logical algorithms, in existence today, for making such decisions and these are not included in this disclosure. In this example, the agent at terminal 204 has sent an accept call message, and the call distributor 200 subsequently redirects the call to the terminal 204. The call distributor 200 then sends out a message to cancel the offer to all machines which received the offer, except terminal 204.

5) At the same time, an acknowledgment is sent to terminal 204.

6) In order to effect the call redirection, the call distributor 200 transmits a redirect message to the original caller 70. The message contains the address of the 204 of the person who should receive the call.

7) The caller's computing device sends a connection request to terminal 204. Terminal 204 matches some attribute such as calling party name, or a user-to-user data item such as a call reference ID to confirm that this connection was the one accepted in step 4.

Call distribution will next be described for the case where a media stream connection is established between the calling and the receiving terminal. The roles of the calling terminal 70, the CRDT 200, and the agent terminals 200,202,204,206 will now be described. As before, a specific S one of the agent terminals 200,202,204,206 will be referred to as terminal x.

The calling terminal sends a call set-up request to the "Help Desk" address, receives a connection message from the receiving terminal, establishes a media stream between the calling and receiving terminals, receives a call transfer message from the receiving terminal identifying terminal x, sends a setup request to terminal x, and receives a setup reply message from terminal x resulting in the establishment of a media stream path. It then sends a disconnect message to receiving terminal.

The receiving terminal receives a "set-up request" message from the calling terminal, sends a connection message to the calling terminal, executes call distribution logic, sends an information message that a call is being diverted to terminal x, sends a transfer message to the calling terminal, receives a disconnect message from the calling terminal.

Terminal x receives an information message that a call is being diverted to the terminal, and acknowledges the message with another information message, receives a setup request from the calling terminal, sends a setup reply message to the calling terminal, resulting in the establishment of a media stream path established.

It is noted that the transfer of a call from the receiving terminal to terminal x can also occur through the use of a 3-way call service or a conference bridge.

The message sequence is summarized in the following table:

| CALLING TERMINAL | RECEIVING TERMINAL | TERMINAL x |
|---|---|---|
| Send Call Set-up request to "Help Desk" at address Receiving Terminal | Receives Set-up request to "Help Desk" from Calling Terminal | |
| Receive Connection message from terminal 1 | Send Connection message to Calling Terminal | |
| Media stream established | Media stream estabiished | |
| | Execute Call Distribution Logic | |
| | Send messaqe to terminal X | Receive message from Receiving terminal |
| Receive "Call Transfer to Terminal x" message from Receiving Terminal | Send "Call Transfer to Terminal x" message to Calling Terminal | |
| Send setup request to Terminal x | | Receive setup request from Terminal x |
| Receive setup reply message from Terminal x | | Send setup reply message to Calling Teminal |
| Send Disconnect message to Receiving Terminal | Receive Disconnect message from Calling Terminal | |

An example of the invention in which no media stream is established, and in which agent based call distribution logic is used to distribute calls to agent terminals which previously indicated availability will be described with reference to FIG. 12.

1) A caller on a CH 70 wants to speak with some one at company ABC. They initiate a packet voice call to the company's packet public voice address, by sending a call setup request message. As before, the call setup request contains a user-to-user data field containing the name of the called party, "help desk" in this case.

2) The CRDT 200 receives the call setup request and analyzes the information within the call setup request to determine the connection is for the company ABC, and not specifically for the agent staffing the agent terminal 200. This determination activates the call distribution logic installed as software on CRDT 200. The call distribution sends a call setup reply to the calling terminal 70 along with a "please wait" message, or some other message indicating that they will be connected shortly. Upon reception of this message, the calling terminal disconnects the call with the CRDT. The caller waits for an agent from company ABC to bet back while he/she does other things.

The call distributor logic then waits for one of the agent terminals 200,202,204,206 to send a call setup request to the call distributor, indicating the availability of that agent. This happens when an agent on a particular agent terminal completes a previous call and is available to take another call. In the illustrated embodiment, the agent at agent terminal 204 is free first, and he sends an availability indication.

3) The call distributor sends a call setup reply to the free agent terminal 204 including a redirection instruction containing the caller's address, and also confirming the availability of the free agent terminal 204.

In response to this the free agent terminal 204 sends a call release message to the call distributor 200.

4) The free agent terminal 204 sends a call setup request to the caller's terminal 70.

5) the caller's terminal receives the request and responds with a call setup reply message, thereby leading to the establishment of a media channel between the caller's terminal and the free agent terminal 204.

Numerous modifications and variations of the present invention are possible in light of the above teachings. It is therefore to be understood that within the scope of the appended claims, the invention may be practised otherwise than as specifically described herein.

In each of the examples described above has employed either "agent based" call distribution logic or "caller based" call distribution logic. Each example has either employed a call transfer message (in the case in which a media stream had previously been established) or a call redirection message (in the case in which no media stream had previously been established). It is to be understood that the invention is not limited to the particular permutations described by way of example. Furthermore, other types of call distribution logic may be used.

The embodiments of the invention in which an exclusive property or privilege is claimed are defined as follows:

1. A personal host operable to be connected to a packet based communications network at a home IP address, the personal host being operable to maintain a care-of IP address to which calls originally directed to the home IP address are to be redirected, the personal host comprising a call redirector operable to respond to a call setup request from a calling host with a call setup reply which includes the care-of IP address.

2. A personal host according to claim 1 operable to receive a registration request from a foreign host identifying the care-of IP address and to send a registration reply to the foreign host indicating that the registration request was successfully received.

3. A personal host according to claim 2 further operable to perform verification of authentication information contained in the registration request before accepting the registration request as being valid.

4. A personal host according to claim 2 further operable to execute a local call screening technique to decide whether or not to send the care-of IP address.

5. A call receiving and distribution terminal for use with a plurality of peer computing devices connected to a packet based communications network, each computing device having an IP address, the call receiving and distribution terminal having a main IP address and comprising a call redirector operable to respond to a call setup request addressed to the main IP address from a calling host with a call setup reply which includes a redirecting IP address consisting of the IP address of one of the plurality of peer computing devices.

6. A call receiving and distribution terminal according to claim 5 further operable to send a message to the plurality of peer computing devices containing an offer to accept a call, to receive an accept call message from one or more of the peer computing devices indicating a willingness to accept the call, and to select as the redirecting IP address the IP address of one of the peer computing devices which responded with an accept call message.

7. A call receiving and distribution terminal according to claim 5 wherein the call redirector is adapted to autonomously determine which peer computing device is to receive the call.

8. A call receiving and distribution terminal according to claim 5 wherein the call redirector is further operable to receive availability indication messages from peer computing devices which are available to take a call, wherein the call redirector maintains a list of available peer computing devices and selects the redirecting IP address on the basis of the list.

9. A peer computing device for use in a call distribution system consisting of a plurality of peer computing devices, each computing device having an IP address, and a call receiving and distribution terminal having a main IP address, the peer computing device being operable to receive a message containing an offer to accept a call and to respond to this message with an accept call message indicating a willingness to accept the call and to send a call setup reply in response to a call setup request subsequently received from a calling host.

10. A peer computing device according to claim 9 further operable to send an availability indication message to the call receiving and distribution terminal when available to take a call.

* * * * *